US 6,558,553 B1

(12) United States Patent
Amal et al.

(10) Patent No.: US 6,558,553 B1
(45) Date of Patent: May 6, 2003

(54) PHOTOCATALYST

(75) Inventors: Rose Amal, Malabar (AU); Donia Beydoun, Bexley (AU); Gary Low, Cronulla (AU); Stephen Mcevoy, Haberfield (AU)

(73) Assignee: Unisearch Limited, Sydney (AU)

( * ) Notice: Subject to any disclaimer, the term of this patent is extended or adjusted under 35 U.S.C. 154(b) by 0 days.

(21) Appl. No.: 09/958,488

(22) PCT Filed: Apr. 12, 2000

(86) PCT No.: PCT/AU00/00313

§ 371 (c)(1),
(2), (4) Date: Jan. 16, 2002

(87) PCT Pub. No.: WO00/61290

PCT Pub. Date: Oct. 19, 2000

(30) Foreign Application Priority Data

Apr. 13, 1999 (AU) .............................. PP 9722

(51) Int. Cl.[7] .................. B01D 35/06; G01J 23/74; G01J 21/06; G01J 37/00; C02F 1/30
(52) U.S. Cl. .................. 210/695; 210/748; 502/325; 502/328; 502/349; 502/350

(58) Field of Search ................. 210/695, 748; 502/325, 338, 349, 350

(56) References Cited

U.S. PATENT DOCUMENTS 4,861,484 A 8/1989 Lichtin et al.
5,703,002 A 12/1997 Towata et al.
5,759,948 A 6/1998 Takaoka et al.

OTHER PUBLICATIONS

Derwent Abstract Accession No. 99–190917/17, CN 1200959 A, Dec. 9, 1998.
Derwent Abstract Accession No. 99–437889/37, JP 11–179212 A, Jul. 6, 1999.

*Primary Examiner*—David A. Reifsnyder
(74) *Attorney, Agent, or Firm*—Larson & Taylor PLC

(57) ABSTRACT

The present invention relates generally to a relatively stable magnetic photocatalyst comprising an insulated magnetite core coated with a layer of photoactive titanium dioxide. In one example the insulation layer is silicon dioxide which blocks direct electrical contact between the titanium dioxide and the magnetite.

13 Claims, 3 Drawing Sheets

PHOTOCATALYST

FIELD OF THE INVENTION

The present invention relates generally to a photocatalyst and relates particularly, though not exclusively, to a photocatalyst suitable for use in a slurry-type photoreactor for degradation of organic compounds or chemicals such as but not restricted to those occurring in waste water effluents.

BACKGROUND TO THE INVENTION

Organic chemicals which may be found as pollutants in waste water effluents from industrial or domestic sources, must be removed or destroyed before discharge to the environment. Such pollutants may also be found in ground and surface waters, which also require treatment to achieve acceptable drinking water quality. Much of the natural purification of aqueous system lagoons, ponds, streams, rivers and lakes is caused by sunlight initiating the breakdown of organic molecules into simpler molecules and ultimately to carbon dioxide and other mineral products. There are various natural sensitisers that accelerate this natural purification process. The utilization of "colloidal semiconductors" and the introduction of catalysts to promote specific redox processes on semiconductor surfaces has been under development since 1976. Laboratory studies have since confirmed that naturally occurring semiconductors enhance this solar driven purification process.

The photocatalytic detoxification or degradation of wastewater is a process that combines heterogeneous catalysis with solar technologies. Semiconductor photocatalysis, with a primary focus on titanium dioxide, has been applied to a variety of problems of environmental interest in addition to water and air purification. The application of illuminated semiconductors for degrading undesirable organics dissolved in air or water is well documented and has been successful for a wide variety of organic compounds. Organic compounds such as alcohols, carboxylic acids, amines, herbicides and aldehydes, have been photocatalytically destroyed in laboratory and field studies. The solar photocatalytic process can also be applied to destroy nuisance odours, taste and odour compounds, and naturally occurring organic matter, which contains the precursors to trihalomethanes formed during the chlorine disinfection step in drinking water treatment. It is thus generally recognised that the photocatalytic process can mineralise hazardous organic chemicals to carbon dioxide, water and simple mineral acids.

Many processes have been proposed over the years and are currently used to destroy organic toxins. Current treatment methods for destruction or degradation of these organic toxins, including adsorption by activated carbon and air stripping, merely concentrate the organics present by transferring them to the adsorbent or air. However, these known treatment methods do not convert the organic toxins into non-toxic wastes. Thus, one of the major advantages of the photocatalytic process over these existing treatment methods is that there is no requirement for further treatment or disposal methods. Another advantage of the photocatalytic process is that when compared to advanced oxidation technologies, especially those using oxidants such as hydrogen peroxide and ozone, expensive oxidising chemicals are not required as ambient oxygen is the oxidant in the photocatalytic process. Photocatalysts are also self regenerated and can be reused or recycled.

It is understood that during the photocatalytic process the illumination of a semiconductor photocatalyst with near ultraviolet radiation activates the photocatalyst establishing a redox environment in an aqueous solution. Semiconductors act as sensitisers for light induced redox processes due to their electronic structure which is characterised by a filled valence band and an empty conduction band. The energy difference between the valence and conduction band is called the bandgap. Several semiconductors have band-gap energies sufficient for catalysing a wide range of chemical reactions. Titanium dioxide is the semiconductor most thoroughly investigated in the literature and is believed to be the most promising for photocatalytic destruction of organic chemicals. It is generally acknowledged that titanium dioxide provides the best compromise between catalytic performance and stability in an aqueous media.

In the photocatalytic detoxification or degradation of, for example, waste water, a large area of reactive photocatalyst surface is required for the large volume of water to be treated. Accordingly there is a need for submicron photocatalyst particles. Generally the photocatalytic reaction is conducted in a suspension of the insoluble semiconductor photocatalyst and, therefore, an additional separation step is required to remove the catalyst from the treated water. The removal of such fine photocatalyst particles from large volumes of water is difficult and involves additional expense in a continuous treatment process. In one reported study charge neutralisation, coagulation and flocculation was investigated as a basis for the enhanced settling and recycling of titanium dioxide in a suspended-photocatalyst system. Although relatively effective, such an approach includes the additional cost for chemicals and a requirement for critical process control. In addressing these problems, research has been carried out by immobilising titania onto various bearing materials, such as glass beads, sand, silica gel, quartz optical fibres, glass fibre in the form of mesh, or on a glass reactor wall. In this research the semiconductor photocatalyst is fixed to a stationary illuminated support and waste water passed over or through the immobilised catalyst bed. This approach has the distinct disadvantage of greatly reducing the available surface area of the catalyst as well as slowing down the photocatalytic reaction due to mass transfer limitations.

SUMMARY OF THE INVENTION

An intention of the present invention is to provide a photocatalyst that is relatively effective in degrading organic compounds whilst being relatively stable.

According to one aspect of the present invention there is provided a photocatalyst comprising:
 a core being at least partly formed of a magnetic material;
 an insulative layer disposed about the core, the insulative layer being formed of an electrically non-conductive material; and
 an outer layer disposed about the insulative layer, the outer layer being formed of a semi-conductor having photocatalytic properties.

According to another aspect of the present invention there is provided a method of forming a photocatalyst comprising the steps of:
 forming an insulative layer about a core which is at least partly formed of a magnetic material, the insulative layer being formed of an electrically non-conductive material; and
 forming an outer layer about the insulative layer, the outer layer being formed of a semi-conductor having photocatalytic properties.

Preferably the step of forming an insulative layer involves exposing the core to a reaction medium and adding appropriate reagents to precipitate the insulative layer on the core. In one embodiment the step of forming a silica-based insulative layer involves suspending the core in a reaction medium of ethanol and adding aqueous tetraethoxysilane in the presence of ammonium hydroxide to precipitate silica on the core.

Alternatively the insulative layer and/or the outer layer may be formed by applying the Chemical Vapour Deposition (CVD) technique or by using Flame Aerosol Technology.

Typically the method of forming the photocatalyst further comprises the step of photodepositing a metal on the outer layer so as to enhance its photocatalytic properties. More typically the step of photodepositing the metal involves mixing the photocatalyst with a solution of metal ions and exposing the resultant suspension to natural or artificial radiation so as to reduce the metal ions and deposit them as the solid metal on the outer layer. In one embodiment the photocatalyst is mixed with a solution of silver nitrate.

According to a further aspect of the present invention there is provided a method of degrading organic compounds in an aqueous solution comprising the steps of:
providing a suspension of a photocatalyst in the aqueous solution, the photocatalyst comprising a core being at least partly formed of a magnetic material, an insulative layer disposed about the core, the insulative layer being formed of an electrically non-conductive material, and an outer layer disposed about the insulative layer, the outer layer being formed of a semi-conductor having photocatalytic properties;
exposing the aqueous solution together with the photocatalyst to natural or artificial radiation so as to promote the degradation of the organic compounds; and
promoting separation of the photocatalyst from the aqueous solution via magnetic separation of the catalyst.

Generally, the insulative layer is formed predominantly of silicon dioxide or silica or a derivative thereof. It is understood that the insulative layer prevents the contact of the magnetic core with the photocatalytic outer layer which ordinarily results in a photo-induced dissolution of the core.

Preferably the magnetic core is formed predominantly of iron oxide or a derivate thereof such as magnetite or maghemite.

Typically the photocatalytic outer layer is formed of titanium dioxide or titania (in the form of anatase crystalline phase) or a derivative thereof.

Preferably the photocatalyst further comprises a metal photodeposited on the outer layer so as to enhance its photocatalytic properties. More preferably the metal is silver. Additionally the metal includes but is not limited to copper or gold.

Generally the natural or artificial radiation is near ultra violet radiation having a wavelength less than 400 nm.

Typically the outer layer is at least partly formed of titanium dioxide or titania in an anatase crystalline form or a derivative thereof.

BRIEF DESCRIPTION OF THE DRAWINGS

In order to achieve a better understanding of the nature of the present invention a preferred embodiment of a photocatalyst and a method of forming a photocatalyst will now be described in some detail, by way of example only, with reference to the accompanying graphs in which.

DETAILED DESCRIPTION OF THE PREFERRED EMBODIMENT

Figure 1:
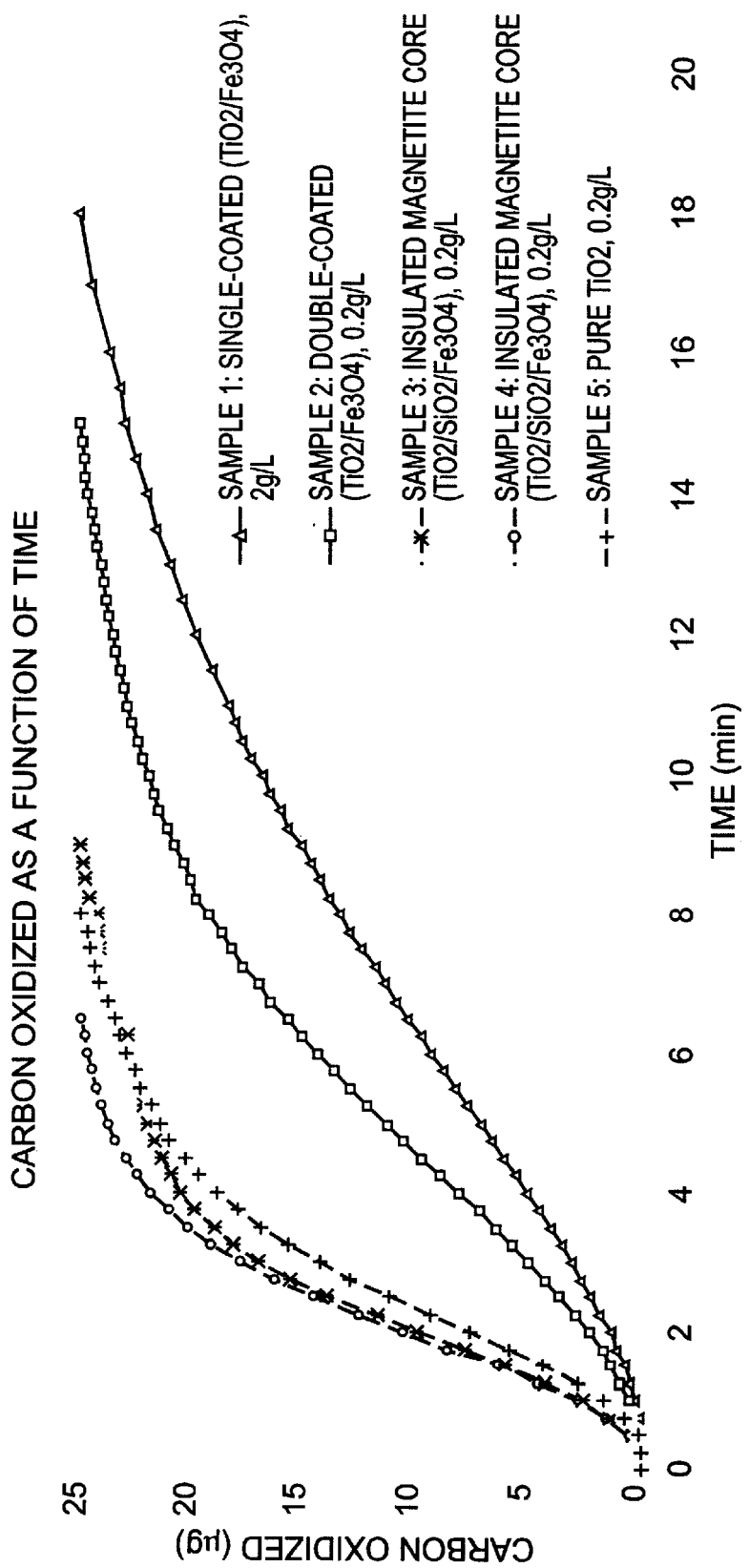
FIG. 1 is a plot of carbon oxidised versus time for various catalysts according to embodiments of the invention together with photocatalysts without an insulative intermediate layer and a single phase titanium dioxide photocatalyst.

According to one embodiment of the invention there is provided a relatively stable magnetic photocatalyst comprising an insulated magnetite core coated with a layer of photoactive titanium dioxide. In this example the insulation layer is silicon dioxide which blocks direct electrical contact between the titanium dioxide and the magnetite.

The photocatalyst is, according to one example prepared by firstly coating magnetite particles with a layer of silicon dioxide. This is achieved by suspending the magnetite particles in a reaction medium, and adding reagents required to precipitate silicon dioxide onto the surface of the seed magnetite particles. In this example the reagents include tetraethoxysilane (TEOS) and water in the presence of ammonium hydroxide and the reaction medium is ethanol. These insulated magnetite particles are then coated with a layer of titanium dioxide using the conventional sol-gel process. This involves deposition of a layer of titanium dioxide through hydrolysis and precipitation of titanium butoxide onto the surface of the insulated magnetite particles which are suspended in the reaction medium. The coated particles in this example are then calcined at 450° C. or 550° C. for a period of time transforming the amorphous TiO2 to its anatase phase.

Various techniques may be used to coat the magnetic core and/or the insulative layer. For example by applying the Chemical Vapour Deposition (CVD) technique. This may be carried out in a fluidized-bed reactor (FBR). The sample to be coated is loaded as a powder in the FBR. The bed of particles is fluidized using a fluidizing gas in the form of an inert gas. The system is heated to operating temperature. Once fluidization is attained, precursors are introduced into the bed either by vapour addition to the fluidizing gas or by direct injection of liquid into the bed. This is followed by evaporation inside the reactor. On reacting, a coating is deposited onto the individual particles of the powdered material. An alternative technique to coat the core particles is by using the Flame Aerosol Technology. The sample to be coated is charged and dispersed as aerosol into the flame reactor. The insulative layer or silica coating could be formed from the combustion of a silicon precursor such as $SiCl_4$, while the photocatalytic layer or $TiO_2$ coating could be formed from the combustion of a titanium precursor such as $TiCl_4$.

It should be appreciated that the insulative layer is not restricted to silicone dioxide but rather extends to other electrically non-conductive materials such as aluminium oxide which preclude direct electrical contact between the magnetic core material and the photocatalytic outer layer. Further, the core may be formed of any suitable material which is magnetic and thus allows magnetic separation. The outer photocatalytic layer may be formed of practically any semi conductor which has photocatalytic properties suited to the detoxification or degradation of organic compounds in an aqueous solution.

The magnetite particles of this embodiment are thus electrically insulated from the photocatalytic outer layer via an intermediate silica layer. This does not adversely affect the intended function of the magnetite particles which are utilised for their magnetic properties to enhance settling rather than their electronic or optical properties. The insulative layer prevents the contact of the magnetic core with the photocatalytic outer layer, in this example the magnetite and titania respectively, which is understood as being the main cause for the photo-induced dissolution of the magnetite core as well as its low activity. The insulative layer should preferably be both chemically inert as well as electronically passive toward the photocatalytic outer layer. The coating of the insulative layer on the magnetic core should be dense enough to prevent the migration of electrons from the photocatalytic outer layer to the core.

The photocatalytic activity of various sample photocatalysts was tested in an aqueous solution of a model sucrose compound. The photocatalytic activity of each photocatalyst was assessed using a photocatalytic reaction system. The system included a photoreactor with a near-UV illumination source and a conductivity monitor for measuring carbon dioxide. An aliquot of the aqueous solution of the model sucrose compound was added to the system containing a suspension of the sample photocatalyst. By monitoring. the rate of formation of carbon dioxide, the rate of mineralisation of the compound could be determined and compared directly with the rates obtained with other photocatalysts.

With reference to FIG. 1 it is clear that the photocatalyst including an insulated magnetite core namely samples 3 and 4, according to one example of the invention outperformed all other samples tested. This included the pure titanium dioxide sample. The other comparative samples 1 and 2, which did not include the insulation layer, exhibited a much lower photoactivity and suffered from a very high incidence of photodissolution.

Figure 2:
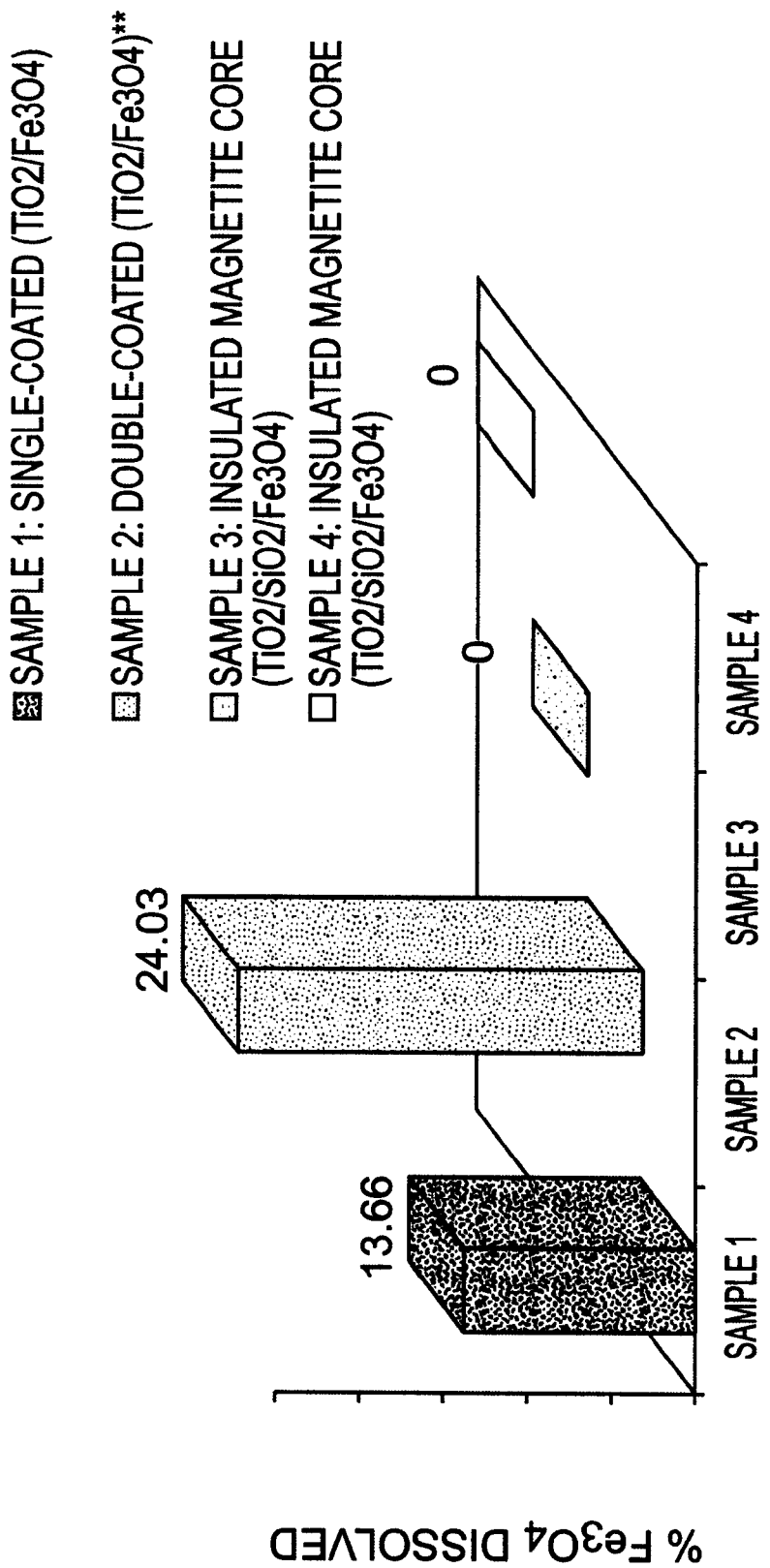
FIG. 2 is a bar graph of photocatalyst stability determined by measuring dissolved iron oxide for various embodiments of a photocatalyst according to the invention compared to photocatalysts without an insulative intermediate layer.

Photodissolution tests were also conducted for the photocatalyst samples trialed in the preceding paragraphs. That is, comparative photodissolution tests were carried for photocatalyst samples including the insulation layer around the magnetic core (samples 3 and 4), and those without the insulation layer (samples 1 and 2). The tests involved collecting the photocatalyst suspension after the photoreaction, that is after the suspension and circulated through the reactor, under near-UV illumination in the presence of sucrose under illumination for 30 minutes. The pH of the suspensions was 3.5. The supernatant was collected through a 0.2-$\mu$m micropore filter, and analysed for Fe ions using atomic absorption spectroscopy. It is clear from FIG. 2 that the samples without the insulation layer suffered a tremendous degree of photodissolution whereas those with the insulation layer were stable.

Figure 3:
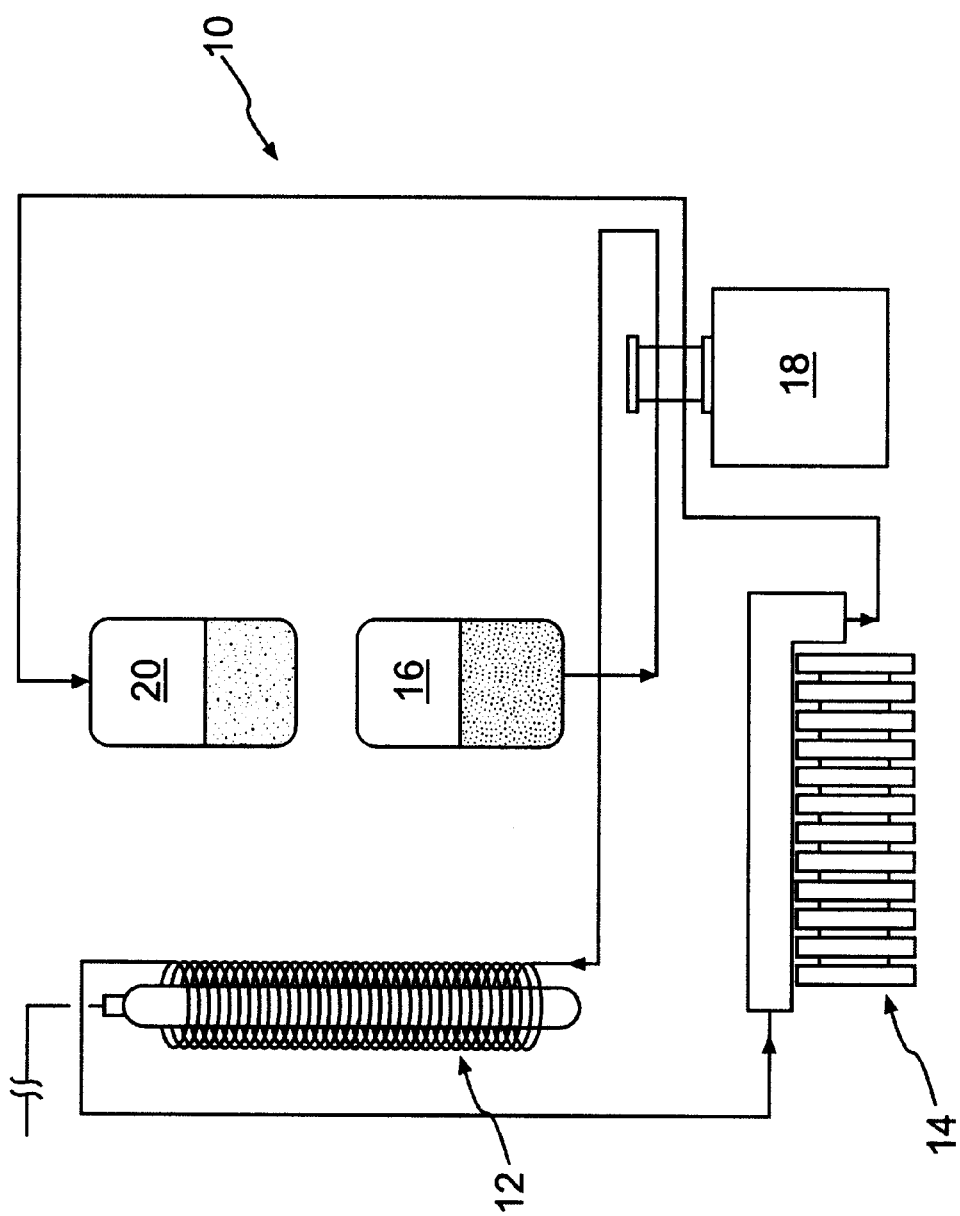
FIG. 3 is a schematic diagram of an experimental rig for the degradation of an organic compound in an aqueous solution using a photocatalyst according to an embodiment of the invention.

The magnetic photocatalyst described above was also used to oxidise methylene blue. A schematic diagram of the experimental rig 10 is shown in FIG. 3. The rig 10 includes a photo-reactor 12 and magnetic separation unit 14 for recovery of the photocatalyst.

Initially, 100 mL of 1000 ppb of a methylene blue solution was mixed with 0.10 g of the magnetic photocatalyst to give a catalyst loading of 0.5 g/L. This slurry was placed in an inlet reservoir 16. A peristaltic pump 18 then pumped the slurry through the photo-reactor 12 at ten (10) cc/min. Following oxidation, the treated slurry was passed through a separation channel of the magnetic separation unit 14 where the photo-catalyst was removed by a series of magnetic bars. The treated liquid was then pumped into an outlet reservoir 20.

Following treatment of the methylene blue solution and entrapment of the magnetic photo-catalyst in the separation channel, the magnetic bars were removed and the channel washed to recover the catalyst. The catalyst was recovered from the concentrated wash slurry by drying in an oven at 60° C. The methylene blue concentration in the inlet and outlet reservoirs was measured by UV-Spectrometry. The efficiency of the magnetic separation unit was measured by Turbidimetry. The flow-rate of the slurry through the system was 20 cc/min. The performance and recovery of the magnetic photo-catalyst was compared with a conventional Degussa ($TiO_2$) catalyst.

Table 1 lists the extent of methylene blue oxidation efficiency and the removal efficiency of the catalyst from the slurry.

TABLE 1

Oxidation efficiency and separation efficiency

| Sample | Oxidation efficiency (%) | Separation efficiency (%) |
|---|---|---|
| Degussa P25/$TiO_2$ | 99.6 | 0 |
| Magnetic photocatalyst | 97.3 | 95.8 |

Oxidation efficiency (%) =
(1 - outlet methylene blue conc (ppb)/1000 (ppb)) × 100
Separation efficiency (%) =
(1 - outlet turbidity (NTU)/inlet turbidity (NTU)) × 100

It is clear from this data that the magnetic photocatalyst achieved similar oxidation efficiencies to that of the conventional Degussa ($TiO_2$) catalyst. Relatively high separation efficiency was also obtained with the magnetic photocatalyst.

The applicant also intends to modify the photocatalyst with metal ion dopants including Cu(II), Ag(I) and Fe(III) so as to enhance its photocatalytic activity. It is envisaged that an appropriate amount of AgNo3, Cu(NO3)2 and Fe(NO3)3 will be mixed with a suspension of the photocatalyst. The mixture can then be illuminated with near-ultraviolet radiation. The doped photocatalyst can then be used to degrade organic matter. It is to be understood that metal such as Ag ions will be deposited onto the photocatalyst as for example silver metal during the photo-oxidation of the organic matter.

It is to be understood that modification of the photocatalyst by the addition of metal dopants, for example AgNO3, will enhance. its photocatalytic activity.

Now that several preferred embodiments of the present invention have been described in some detail it will be apparent to those skilled in the art that the photocatalyst and method of forming a photocatalyst have at least the following advantages:

(1) the photocatalyst is relatively stable in the aqueous solution containing the organic contaminants with minimal photo-induced dissolution of the magnetic core;

(2) the photocatalyst incorporating a magnetic core lends itself to enhanced settling or separation via magnetic separation; and (3) the photocatalyst exhibits relatively high photo activity in its detoxification or degradation of organic compounds or chemicals in an aqueous solution.

Those skilled in the art will appreciate that the invention described herein is susceptible to variations and modifications other than those specifically described. For example, the magnetic core may be formed partially rather than wholly of a magnetic material provided the photocatalyst of this example displays enhanced settling under a magnetic field.

All such variations and modifications are to be considered within the scope of the present invention the nature of which is to be determined from the foregoing description.

The claims defining the invention are as follows:

1. A photocatalyst comprising:

a core being at least partly formed of a magnetic material;

an insulative layer disposed about the core, the insulative layer being formed of an electrically non-conductive material; and an outer layer disposed about the insulative layer, the outer layer being formed of a semi-conductor having photocatalytic properties.

2. A photocatalyst as defined in claim 1 wherein the insulative layer is formed predominantly of silicon dioxide or silica or a derivative thereof.

3. A photocatalyst as defined in claim 1 wherein the magnetic core is formed predominantly of iron oxide or a derivate thereof.

4. A photocatalyst as defined in claim 1 wherein the photocatalytic outer layer is formed of titanium dioxide or titania or a derivative thereof.

5. A photocatalyst as defined in claim 1 further comprising a metal photodeposited on the outer layer so as to enhance its photocatalytic properties.

6. A photocatalyst as defined in claim 5 wherein the metal is silver.

7. A method of forming a photocatalyst comprising the steps of:

forming an insulative layer about a core which is at least partly formed of a magnetic material, the insulative layer being formed of an electrically non-conductive material; and forming an outer layer about the insulative layer, the outer layer being formed of a semi-conductor having photocatalytic properties.

8. A method of forming a photocatalyst as defined in claim 7 wherein the step of forming an insulative layer involves exposing the core to a reaction medium and adding appropriate reagents to precipitate the insulative layer on the core.

9. A method of forming a photocatalyst as defined in claim 7 wherein the insulative layer and/or the outer layer may be formed by applying the Chemical Vapour Deposition (CVD) technique or by using Flame Aerosol Technology.

10. A method of forming a photocatalyst as defined in claim 7 further comprising the step of photodepositing a metal on the outer layer so as to enhance its photocatalytic properties.

11. A method of forming a photocatalyst as defined in claim 10 wherein the step of photodepositing the metal involves mixing the photocatalyst with a solution of metal ions and exposing the resultant suspension to natural or artificial radiation so as to reduce the metal ions and deposit them as the solid metal on the outer layer.

12. A method of degrading organic compounds in an aqueous solution comprising the steps of:

providing a suspension of a photocatalyst in the aqueous solution, the photocatalyst comprising a core being at least partly formed of a magnetic material, an insulative layer disposed about the core, the insulative layer being formed of an electrically non-conductive material, and an outer layer disposed about the insulative layer, the outer layer being formed of a semi-conductor having photocatalytic properties;

exposing the aqueous solution together with the photocatalyst to natural or artificial radiation so as to promote the degradation of the organic compounds; and promoting separation of the photocatalyst from the aqueous solution via magnetic separation of the catalyst.

13. A method of degrading organic compounds in an aqueous solution as defined in claim 12 wherein the natural or artificial radiation is near ultra violet radiation having a wavelength less than 400 nm.

* * * * *